United States Patent [19]
Pawlowski et al.

[11] Patent Number: 5,812,803
[45] Date of Patent: Sep. 22, 1998

[54] METHOD AND APPARATUS FOR CONTROLLING DATA TRANSFERS BETWEEN A BUS AND A MEMORY DEVICE USING A MULTI-CHIP MEMORY CONTROLLER

[75] Inventors: Stephen S. Pawlowski; Patrick F. Stolt, both of Beaverton, Oreg.

[73] Assignee: Intel Corporation, Santa Clara, Calif.

[21] Appl. No.: 536,662

[22] Filed: Sep. 29, 1995

[51] Int. Cl.$^6$ .............................. G06F 13/38; G06F 12/00
[52] U.S. Cl. ............................................ 395/309; 395/427
[58] Field of Search .................................. 395/309, 427

[56] References Cited

U.S. PATENT DOCUMENTS

| | | | |
|---|---|---|---|
| 4,558,429 | 12/1985 | Barlow et al. | 364/900 |
| 5,526,506 | 6/1996 | Hyatt | 395/438 |

OTHER PUBLICATIONS

Gwennap, Linley, "Intel's P6 bus designed for multiprocessing . . . ", Microprocessor Report, v9, n7, pp. 1–6, May 30, 1995.

Uffenbeck, John, "The 8086/8088 Family: Design, Programming, and Interfacing", Regents/Prentice Hall, New Jersey, pp. 327–330, 1987.

Popescu, Val, Merle Schultz, John Spracklen, Gary Gibson, Bruce Lightner and David Isaman, "The Metaflow Architecture", IEEE Micro, Jun. 1991, pp. 10–31 and 63–73.

*Primary Examiner*—Ayaz R. Sheikh
*Assistant Examiner*—Jigor Pancholi
*Attorney, Agent, or Firm*—Blakely, Sokoloff, Taylor & Zafman

[57] ABSTRACT

A method and apparatus for controlling data transfers between a bus and a memory device using a multi-chip memory controller includes a memory controller having a data controller unit and a data path unit. Signals are passed between the data controller unit and the data path unit, thereby providing an interface between the two units. The data controller receives control signals from the bus and provides commands to the data path unit in response to these control signals. The commands provided to the data path unit enable the data path unit to transfer data to and from the bus and memory device.

14 Claims, 8 Drawing Sheets

METHOD AND APPARATUS FOR CONTROLLING DATA TRANSFERS BETWEEN A BUS AND A MEMORY DEVICE USING A MULTI-CHIP MEMORY CONTROLLER

BACKGROUND OF THE INVENTION

1. Field of the Invention

The present invention pertains to computer systems and memory controllers. More particularly, this invention relates to controlling a memory device using a multi-chip memory controller.

2. Background

Computer technology is continuously advancing, resulting in modern computer systems which provide ever-increasing performance. A wide variety of techniques are used by engineers and system designers to obtain this increased performance. One such technique is to couple multiple devices to the computer system bus. These multiple devices can include, for example, processors and data storage devices. Another technique is to increase the speed of the bus which couples these devices together, thereby increasing the speed at which the devices can communicate with one another.

One important component in many computer systems is a memory controller. The memory controller provides an interface between the memory device (e.g., RAM) and a computer system bus. Typically, memory controllers in prior art systems have been constructed in a single-chip package. However, as memory systems become larger and buses become faster, the single-chip package can become very large.

As memory controller chips become larger, a point is eventually reached where it is beneficial to construct the memory controller using multiple chips. One reason for this is economic: the cost of producing an integrated circuit (IC) chip such as a memory controller chip increases exponentially as the number of pins on the chip increases.

Each chip which is physically connected to the bus, commonly referred to as a physical load, creates a capacitance and a resistance on the bus. Thus, the greater the number of physical loads, the greater this capacitive and resistive affect. If a large enough number of physical loads are coupled to the bus, the capacitive and resistive affects of the physical loads reduces the effective operating speed of the bus. In many systems the number of physical loads which can adversely affect bus performance in this manner is relatively low, such as three or four loads.

In order to reduce the number of physical loads, some computer systems implement a "one physical load per logical load" constraint. A "logical load" is one logical device on the bus (e.g., a processor, a bus bridge, or a memory controller). The one physical load per logical load constraint requires each logical load to be only one physical load on the bus. This constraint creates a special problem for a multiple-chip memory controller, because typically multiple chips create multiple physical connections, and thus multiple physical loads. Thus, it would be beneficial to provide a multiple-chip memory controller which conforms to the one physical load per logical load constraint.

A multiple-chip memory controller which conforms to the one physical load per logical load constraint should be able to share signals between the multiple chips. This is due to the fact that, in order to satisfy the constraint, each signal line of the bus can be coupled to at most one of the multiple chips. This could result, for example, in signals which are received from the bus by one chip being transferred to a second chip. Such transferring of signals, however, can adversely affect the speed of the computer system bus. That is, the fully realized bus bandwidth is reduced if the bus is forced to stay idle for one or more clock cycles while signals are transferred between the chips of the memory controller. Thus, it would be beneficial to provide a multiple-chip memory controller which does not adversely affect the speed of the bus.

The present invention provides for these and other advantageous results.

SUMMARY OF THE INVENTION

A method and apparatus for controlling data transfers between a bus and a memory device using a multi-chip memory controller is described herein. The memory controller includes a data controller unit and a data path unit. Signals are passed between the data controller unit and the data path unit, thereby providing an interface between the two units. The data controller receives control signals from the bus and provides commands to the data path unit in response to these control signals. The commands provided to the data path unit enable the data path unit to transfer data to and from the bus and memory device.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the discussions to follow, certain signals are discussed followed by a "#". This notation is used to indicate a signal which is active when in a low state (that is, a low voltage). It is to be appreciated, however, that the present invention includes implementations where these signals are active when in a high state rather than when in a low state. Similarly, the present invention includes implementations where signals discussed herein which are not followed by a "#" are active when in a low state.

Figure 1:
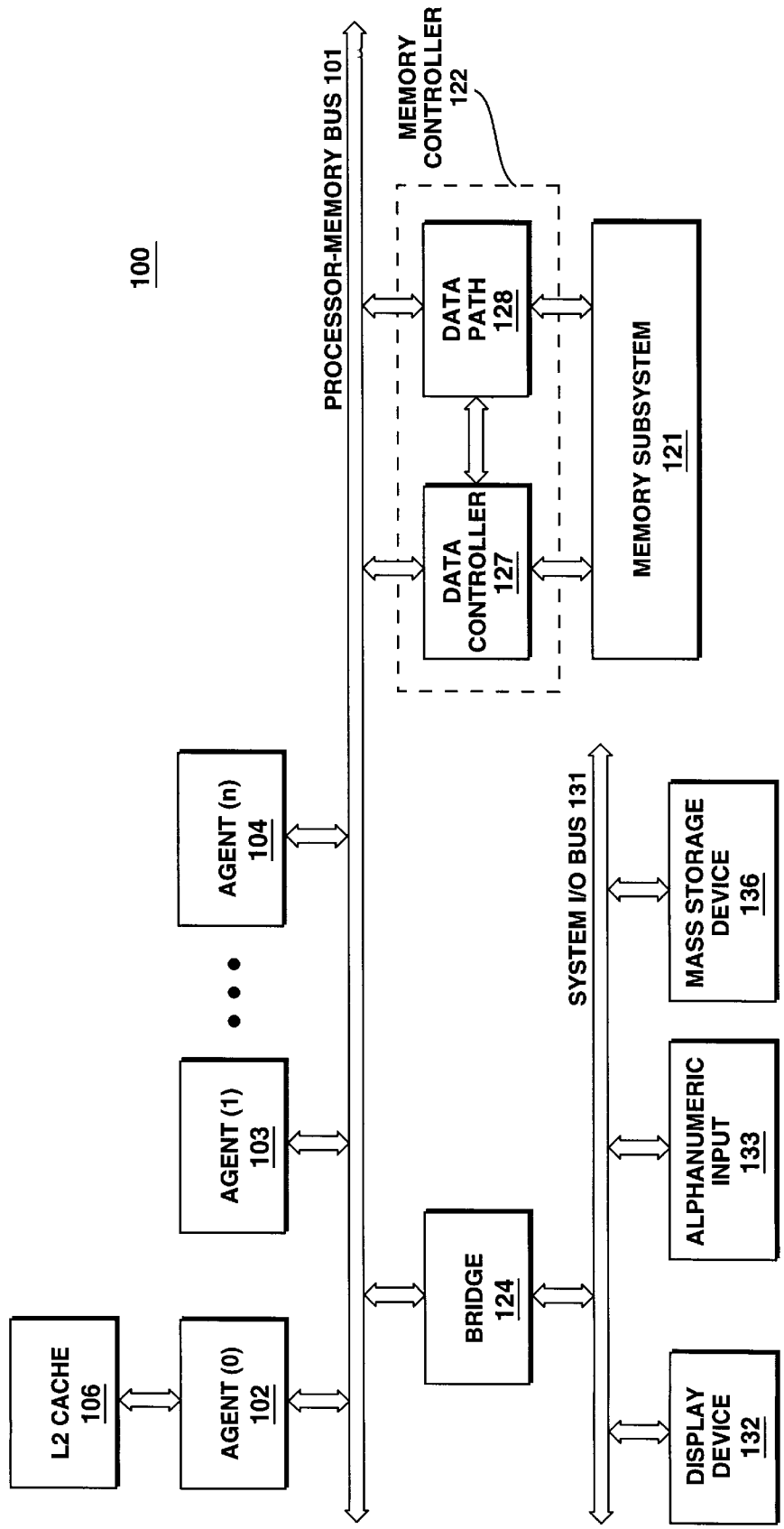
FIG. 1 shows an overview of an example multiprocessor computer system according to one embodiment of the present invention.

FIG. 1 shows an overview of an example multiprocessor computer system of the present invention. The computer system 100 generally comprises a processor-memory bus or other communication means 101 for communicating information between one or more agents 102, 103 and 104. Processor-memory bus 101 includes arbitration, address, data and control buses (not shown). In one embodiment, agents 102 through 104 include a small, extremely fast internal cache memory (not shown), commonly referred to as a level one (L1) cache memory for temporarily storing data and instructions on-chip. In addition, a bigger, slower level two (L2) cache memory 106 can be coupled to an agent, such as agent 102, for temporarily storing data and instructions for use by the agent. Each processor may have its own, optional L2 cache memory, or some processors may share an L2 cache.

Agents 102, 103 and 104 may each be parallel processors (that is, symmetric co-processors), or alternatively, agents 102 through 104 may be asymmetric co-processors, such as a digital signal processor. In addition, processors 102 through 104 may include processors of different types. In one embodiment, the present invention includes Intel® Architecture microprocessors as agents 102 through 104, such as i386™, i486™, or Pentium® processors. However, the present invention may utilize any type of microprocessor architecture. It is to be appreciated that the particular architecture(s) used are not especially germane to the present invention.

The processor-memory bus 101 provides system access to the memory and input/output (I/O) subsystems. A memory controller 122 is coupled to processor-memory bus 101 for controlling access to a memory subsystem 121 for storing information and instructions for agents 102 through 104. In one embodiment, memory controller 122 includes a data controller (DC) unit 127 and a data path (DP) unit 128. In one implementation, data controller 127 and data path 128 are each a physically separate Application Specific Integrated Circuit (ASIC).

An input/output (I/O) bridge 124 is coupled to processor-memory bus 101 and system I/O bus 131 to provide a communication path or gateway for devices on either processor-memory bus 101 or I/O bus 131 to access or transfer data between devices on the other bus. Essentially, bridge 124 is an interface between the system I/O bus 131 and the processor-memory bus 101.

I/O bus 131 communicates information between peripheral devices in the computer system. Devices that may be coupled to system bus 131 include, for example, a display device 132, such as a cathode ray tube, liquid crystal display, etc., an alphanumeric input device 133 including alphanumeric and other keys, etc., for communicating information and command selections to other devices in the computer system (e.g., agent 102), and a mass storage device 136, such as a magnetic disk and disk drive, for storing information and instructions.

In one embodiment of the present invention, memory subsystem 121 is a dynamic storage device, commonly referred to as a main memory. Memory subsystem 121 may comprise any of a wide variety of dynamic storage devices, such as a random access memory. In one implementation, memory subsystem 121 includes multiple dynamic random access memory (DRAM). Alternatively, memory subsystem 121 may include static random access memory (SRAM), extended data out random access memory (EDO), or any other of a wide variety of memory devices.

It is to be appreciated, however, that memory subsystem 121 could be any of a wide variety of storage devices, such as a nonvolatile storage device (e.g., EEPROM or Flash memory) or a cache coupled to a mass storage device.

In one embodiment of the present invention, processor-memory bus 101 operates at a speed of 66 MHz and includes a 64-bit data bus. However, it is to be appreciated that the present invention is applicable to any of a wide variety of data bus widths and speeds.

In certain implementations of the present invention, components may be re-arranged. For example, L2 cache memory 106 may be situated between processor 105 and processor-memory bus 101. Furthermore, certain implementations of the present invention may not require nor include all of the above components. For example, agents 102 and 103 or mass storage device 125 may not be included in system 100. Additionally, the peripheral devices shown coupled to system I/O bus 131 may be coupled to processor-memory bus 101; in addition, in some implementations only a single bus may exist with the agents 102 through 104, memory controller 122, and peripheral devices 132, 133 and 136 coupled to the single bus. Furthermore, additional components may be included in system 100, such as additional processors, a display device coupled to processor-memory bus 101, a mass storage device coupled to processor-memory bus 101, a network interface (such as an ethernet adapter) coupled to system I/O bus 131, etc.

Figure 2:
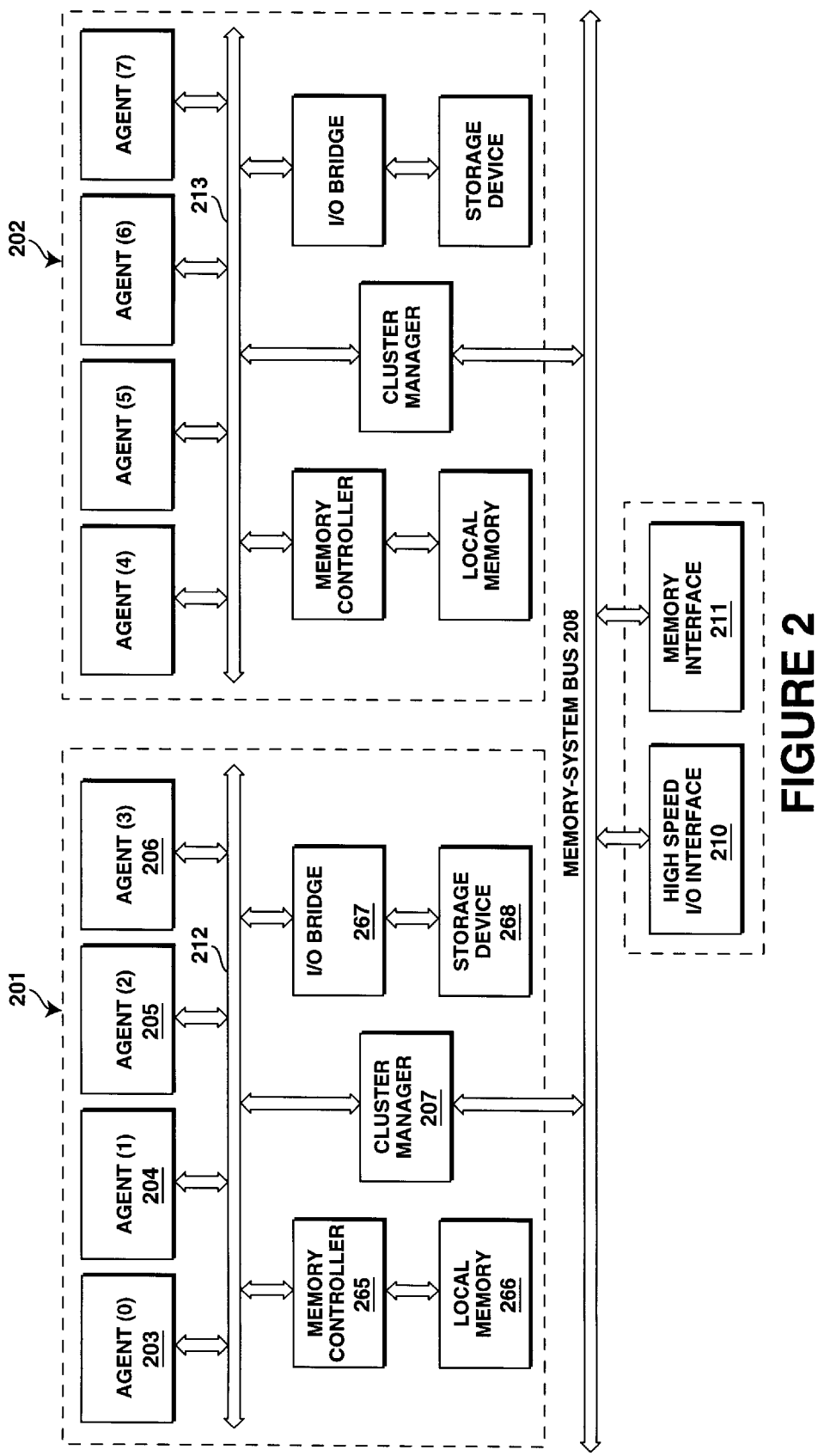
FIG. 2 is a block diagram showing an exemplary bus cluster system such as may be used in an alternatively configured system which includes the present invention.

FIG. 2 is a block diagram showing an exemplary bus cluster system such as may be used in an alternatively configured system which includes the present invention. FIG. 2 shows two clusters 201 and 202 of agents. Each of these clusters is comprised of a number of agents. For example, cluster 201 is comprised of four agents 203–206 and a cluster manager 207, which may include another cache memory (not shown), coupled to bus 212. Agents 203–206 can include microprocessors, co-processors, digital signal processors, etc.; for example, agents 203 through 206 may be the same as processor 102 shown in FIG. 1. Cluster manager 207 and its cache are shared between these four agents 203–206. Each cluster is coupled to a memory-system bus 208. These clusters 201 and 202 are coupled to various other components of the computer system through a system interface 209. The system interface 209 includes a high speed I/O interface 210 for interfacing the computer system to peripheral devices (not shown) and a memory interface 211 which provides access to a global main memory (not shown), such as a DRAM memory array. In one embodiment, high speed I/O interface 210 is bridge 124 of FIG. 1, and memory interface 211 is memory controller 122 of FIG. 1.

In one embodiment of the present invention, each cluster also includes a local memory controller and/or a local I/O bridge. For example, cluster 201 may include a local memory controller 265 coupled to processor bus 212. Local memory controller 265 manages accesses to a RAM or other local memory 266 contained within cluster 201. Cluster 201 may also include a local I/O bridge 267 coupled to processor bus 212. Local I/O bridge 267 manages accesses to I/O devices within the cluster, such as a mass storage device 268, or to an I/O bus, such as system I/O bus 131 of FIG. 1. In one implementation, memory controller 265 is analogous to memory controller 122 of FIG. 1.

In one embodiment of the present invention, buses 212 and 213 and memory-system bus 208 operate analogous to processor-memory bus 101 of FIG. 1.

Certain implementations of the present invention may not require nor include all of the above components. For example, cluster 201 or 202 may comprise fewer than four agents. Alternatively, cluster 201 and 202 may not include the memory controller, local memory, I/O bridge, and storage device. Additionally, certain implementations of the present invention may include additional processors or other components.

In one embodiment of the present invention, bus transactions occur on the processor-memory buses described above in FIGS. 1 and 2 in a pipelined manner. That is, multiple bus transactions may be pending at the same time, wherein each is not fully completed. Therefore, when a requesting agent begins a bus transaction by driving an address onto the address bus, the bus transaction may be only one of a number of bus transactions currently pending. Although bus transactions are pipelined, the bus transactions in the present invention do not have to be fully completed in order. Therefore, the present invention allows for completion replies to requests to be out-of-order.

In one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions or unaligned memory operations which software expects to be atomic. In this embodiment, a transaction is the set of bus activities related to a single request, from request bus arbitration through the data transfer on the data bus.

In one embodiment of the present invention, a transaction contains up to six distinct phases. However, certain phases are optional based on the transaction and response type. Alternatively, additional phases could also be added. A phase uses a particular signal group to communicate a particular type of information. In one implementation, these phases are:

Arbitration Phase
Request Phase
Error Phase
Snoop Phase
Response Phase
Data Transfer Phase In one implementation, the data transfer phase is optional and is used if a transaction is transferring data. The data phase is request-initiated if the data is available from the agent initiating the request (for example, for a write transaction). The data phase is response-initiated if the data is available from the agent responding to the request at the time of generating the transaction response (for example, for a read transaction). A transaction may contain both a request-initiated data transfer and a response-initiated data transfer.

Figure 3:
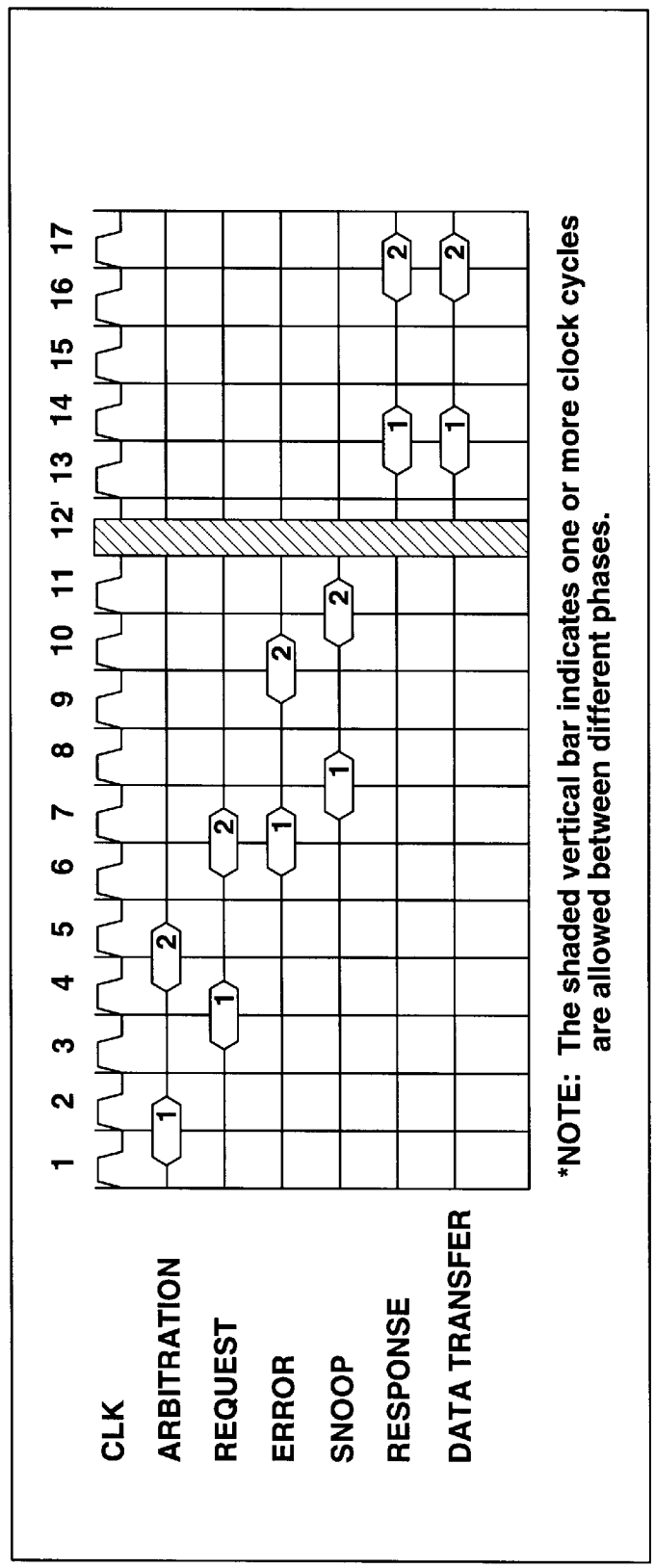
FIG. 3 shows an example of overlapped phases for two bus transactions according to one embodiment of the present invention.

Different phases from different transactions can overlap, thereby pipelining bus usage and improving bus performance. FIG. 3 shows an example of overlapped phases for two transactions. Referring to FIG. 3, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clocks after ownership is requested.

The second phase is the request phase, in which the bus owner drives request and address information on the bus. In one implementation, the request phase is one or more clocks after bus ownership is granted (provided there is an arbitration phase), and is two clocks long. In the first clock, an address signal is driven along with the transaction address and sufficient information to begin snooping a memory access. In the second clock, the byte enables, a transaction identifier, and the requested data transfer length are driven, along with other transaction information.

The third phase of a transaction is an error phase. The error phase indicates any immediate errors, such as parity errors, triggered by the request. If an error is discovered, an error signal is asserted during the error phase by the agent which detected the error in the transaction. When an error is indicated, the transaction is immediately dropped (that is, the transaction progresses no further in the pipeline) and may be re-driven by the agent which issued the transaction. Whether the agent re-issues the transaction depends on the agent itself. In one implementation, the error phase is three clocks after the request phase.

In one embodiment, every transaction that is not canceled because of an error in the error phase has a snoop phase. The snoop phase indicates if the cache line accessed in a transaction is not valid, valid or modified (dirty) in any agent's cache. In one implementation, the snoop phase is four or more clocks from the request phase.

The response phase indicates whether the transaction failed or succeeded, whether the response is immediate or deferred, whether the transaction will be retried, or whether the transaction includes data phases. If a transaction contains a response-initiated data phase, then it enters the data transfer phase along with the response phase.

If the transaction does not have a data phase, then that transaction is complete after the response phase. If the requesting agent has write data to transfer, or has requested read data, the transaction has a data phase which may extend beyond the response phase. The data phase occurs only if a transaction requires a data transfer. The data phase can be response initiated (for example, by the memory controller or another processor) or request initiated.

In one embodiment of the present invention, implicit write backs can also occur on the bus. An implicit write back occurs when an agent coupled to the bus places a request on the bus targeting a cache line which is stored in modified (dirty) state in a cache coupled to the bus. For example, an agent may perform a write transaction over the bus of eight bytes of data, however the cache line which includes those eight bytes is stored in modified state in another agent's cache. In this situation, the cache which contains the cache line in modified state (or the agent which is coupled to the cache) issues a hit modified signal on the bus during the snoop phase for the transaction. The agent which originated the request places the write data onto the bus, which is retrieved by the data path. Then, in the data transfer phase of the transaction, the cache which contains the cache line in modified state writes the cache line to the bus. Any of the data in the cache line which was not written to by the original agent is then merged with the write data from the original data transfer.

Figure 4:
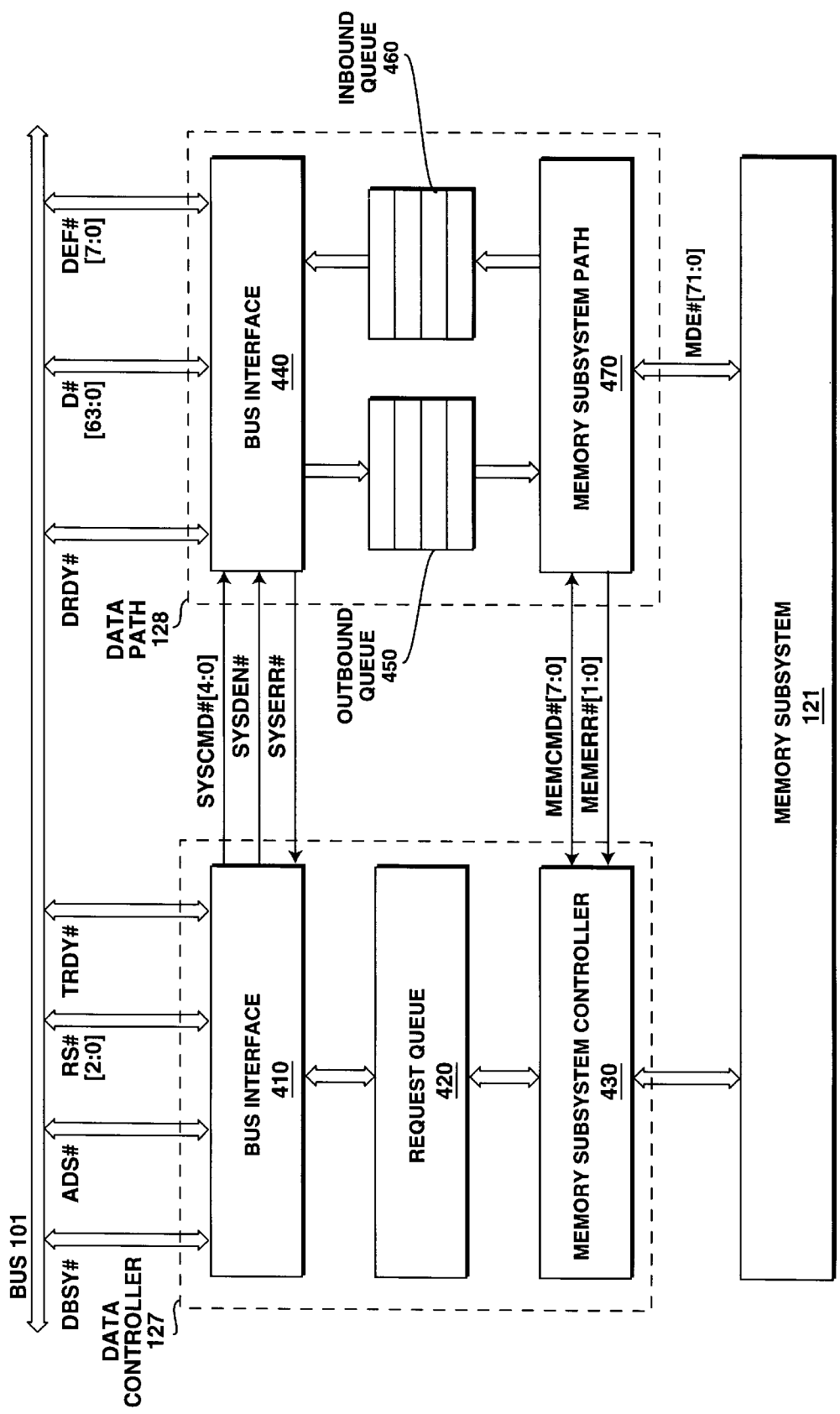
FIG. 4 is a block diagram showing a memory controller according to one embodiment of the present invention.

FIG. 4 is a block diagram showing a memory controller according to one embodiment of the present invention. Memory controller 122 includes a data controller (DC) unit 127 and a data path (DP) unit 128. In the embodiment shown in FIG. 4, DC 127 and DP 128 are two separate ASICs. Memory controller 122 divides the control responsibilities and the data responsibilities between the two chips. Data controller 127 is responsible for retrieving requests from bus 101 and providing the necessary control signals to memory subsystem 121 in order to obtain access to any requested memory locations. Data path 128 provides for the data flow between bus 101 and memory subsystem 121, based on commands received from data controller 127.

Memory controller 122 transfers information to and from bus 101 using multiple signals. In one embodiment, these signals include those shown in Table I below. Table I also shows whether the signals are connected to DC 127 or to DP 128. It is to be appreciated that additional address and control signals can also be used to transfer information between memory controller 122 and bus 101, however these signals have not been shown so as not to obscure the present invention.

TABLE I

| Signal | Connection | Description |
|---|---|---|
| ADS# | DC | Address Strobe. Indicates that the current cycle is the beginning of a request. In one implementation, the request is two cycles. |
| DBSY# | DC | Data Bus Busy. Used by the data bus owner to hold the data bus for transfers requiring more than one cycle. |
| DRDY# | DP | Data Ready. Asserted for each cycle that data is transferred. |
| RS#[2:0] | DC | Response. Indicates type of response for the request. |
| TRDY# | DC | Target Ready. Indicates a valid response cycle. Used with a write command to indicate the target agent is ready to receive the write data. |
| D#[63:0] | DP | Data. |
| DEP#[7:0] | DP | Data ECC/Parity. In one implementation, ECC (Error Correction Code) is computed over the 64 data bits. In one implementation, memory controller 122 does not generate or check parity. |

It should be noted that each signal shown in Table I is connected to either DC 127 or to DP 128, but not to both. By separating the signal connections between DC 127 and DP 128, memory controller 122 adheres to the one physical load per logical load constraint.

In some of the discussions which follow, the data bus is referred to as a 72-bit bus (e.g., D#[71:0]). In these discussions, the eight Data ECC/Parity bits have been included with the 64 data bits.

Data controller 127 includes bus interface 410, request queue 420, and memory subsystem controller 430. Bus interface 410 contains the latches and necessary circuitry for interfacing between bus 101 and the remaining components of data controller 127. Bus interface 410 receives (e.g., latches in) requests issued on bus 101 by other agents and, for transactions which target memory controller 122, forwards them to request queue 420. Bus interface 410 also contains control logic for issuing system commands to data path 128. These system commands provide data path 128 with the information necessary to receive data from and place data onto bus 101. A further discussion of these commands and their timing is discussed in more detail below.

Request queue 420 receives requests from bus interface 410 and queues them for transfer to memory subsystem controller 430. It should be noted that request queue 420 need not be a first-in first-out (FIFO) queue. Transactions are placed into queue 420 as they are received and are forwarded to memory subsystem controller 430 during the data phase for the transactions. In one embodiment, bus interface 410 maintains a record of all transactions currently outstanding on the bus and provides a signal to request queue 420 at the start of the data phase for a transaction.

By not imposing FIFO ordering on queue 420, transactions can be responded to more efficiently. For example, a write transaction could be issued on the bus followed by a read transaction. If the data for the write transaction has not been placed on the bus yet, but the memory system is ready for the read transaction, then the read transaction is forwarded to the memory subsystem controller 430, thereby bypassing the previously issued write transaction.

Alternatively, request queue 420 may be a FIFO queue, thereby preventing subsequently issued transactions from accessing the memory subsystem before previously issued transactions.

Memory subsystem controller 430 receives transactions from request queue 420 and provides the necessary control signals to memory subsystem 121 to read or write the data, depending on the transaction. The control signals provided by memory subsystem controller 430 are dependent on the type of memory cells used by memory subsystem 121. In one embodiment, the control signals comprise row address strobe (RAS) and column address strobe (CAS) signals. Additionally, for write transactions, write enable (WE) signals may also be issued.

Memory subsystem controller 430 also includes control logic for issuing memory commands to data path 128. These memory commands provide data path 128 with the information necessary to transfer data to and from memory subsystem 121. A further discussion of these commands and their timing is discussed in more detail below.

Data path 128 includes bus interface 440, outbound data queue 450, inbound data queue 460, and memory subsystem path 470. Bus interface 440 contains the latches and necessary circuitry for interfacing between bus 101 and the remaining components of data path 128. Bus interface 440 receives data from bus 101 and places it into outbound data queue 450. Similarly, bus interface 440 also places data from inbound data queue 460 onto bus 101. The control signals used to indicate when to retrieve data from the bus or place data onto the bus are received from data controller 127.

Data which is received from bus 101 is placed into outbound data queue 450. In one embodiment of the present invention, both the outbound data queue 450 and the inbound data queue 460 contains four elements, each of which can correspond to a single transaction on bus 101. In one implementation, each of the elements of outbound data queue 450 and inbound data queue 460 corresponds to a data buffer which includes storage space for a single cache line. In one mode of operation, a cache line is 32 bytes.

After being placed in the outbound data queue 450, data is transferred to memory subsystem path 470. Memory subsystem path 470 provides an interface between memory subsystem 121 and data path 128. Data which is received from bus 101 is provided to the appropriate memory cells (as activated by memory subsystem controller 430 of data controller 127) via memory subsystem path 470. In one embodiment, data is transferred to and from memory subsystem 121 in 32-byte cache line units.

For transactions requiring data to be read from memory subsystem 121, the data is received by memory subsystem path 470 and placed into the inbound data queue 460. The data is then transferred to bus 101 via bus interface 440.

Memory subsystem path 470 also includes the logic to interact with memory subsystem controller 430. Path 470 receives memory command signals from controller 430 which indicate to path 470 when data is going to be transferred to and from memory subsystem 121, as discussed in more detail below. In addition, memory subsystem path 470 also provides an indication to memory subsystem controller 430 of data controller 127 when data has been completely transferred from memory subsystem 121 to inbound data queue 460. In one mode of operation, this indication is a set of valid bits with a bit associated with each 64-bit chunk of data.

Table II shows a summary of the system and memory commands of the interface between data controller 127 and data path 128 according to one embodiment of the present invention. Through the use of the signals shown in Table II, the present invention allows the data controller and data path to effectively operate as a single physical load on the bus even though they comprise two physically separate devices.

TABLE II

| Signal | Source | Destination | Definition |
| --- | --- | --- | --- |
| SYSCMD#[4:0] | DC | DP | These signals are used to encode the requested command type (data transfer direction and function) from the bus interface to the DP. These signals also provide the base address of the data buffer (either outbound or inbound data buffers) used in the data transfer request. |
| SYSDEN# | DC | DP | This signal is asserted to cause the DP to begin data transfer to or from the bus. |
| MEMCMD#[7:0] | DC and DP | DC and DP | These signals are used to encode the requested command type (data transfer direction and function) from the controller to the DP. |
| MEMERR#[1:0] | DP | DC | These signals are used by the DP to inform the DC that a data error has been detected. |
| SYSERR# | DP | DC | This signal is asserted to indicate a system side data error. |

In one implementation, the SYSDEN# command is asserted by data controller 127 for one clock cycle, two clock cycles after the system side command is sent and one cycle before data is to be asserted onto the bus. SYSDEN# indicates the data transfer is to begin. Thus, the SYSDEN# signal can be used, for example, to delay data path 128 from placing data on the bus while another agent is using the data bus (e.g., another agent is asserting DBSY#). In one implementation, the SYSDEN# signal provides a cutoff point for when the transaction can be aborted. In this implementation, a transaction can be aborted prior to assertion of the SYSDEN# signal, but cannot be aborted subsequent to assertion of the SYSDEN# signal.

Table III shows a description of the memory error encoding for the MEMERR#[1:0] bits according to one embodiment of the present invention.

TABLE III

| MEMERR#[1:0] | Description |
| --- | --- |
| 00 | No error |
| 01 | Correctable memory error in lower half of transfer. |
| 10 | Correctable system error. |
| 11 | Correctable memory error in upper half of transfer. |

Table IV shows the encoding for the system commands SYSCMD#[4:2] according to one embodiment of the present invention.

TABLE IV

| SYSCMD#[4:2] | Description | Type |
| --- | --- | --- |
| 000 | No command | 1 cycle |
| 001 | Reserved | — |
| 010 | Implicit Write Back | 3 cycle |
| 011 | Reserved | — |
| 100 | Abort | 1 cycle |
| 101 | Clear | 1 cycle |
| 110 | Read | 2 cycle |
| 111 | Write | 2 cycle |

In one embodiment of the present invention, a set of commands is issued over the SYSCMD#[4:2] lines as indicated above in Table IV. These commands are used by data path 128 to set up and perform the necessary data transfers, depending on the particular bus request. A summary of these commands follows.

Read: Indicates to the bus interface of the data path that a read transaction is occurring and that data will immanently be available from the memory subsystem for placement on the bus. The data controller provides a buffer number identifying a buffer corresponding to the inbound data queue which the data path should put the data into and the length of the read transaction. Upon receiving the read command, the data path sets up the appropriate internal data paths to place data into the buffer indicated by the data controller.

Write: Indicates to the bus interface of the data path to take data off the bus. The data controller provides a buffer number identifying a buffer corresponding to the outbound data queue which the data path should put the data into and the length of the write transaction. Upon receiving the write command, the data path sets up the appropriate internal data paths to place data into the buffer indicated by the data controller.

Abort: Indicates to the bus interface of the data path that a previously issued request from the bus interface of the data controller is to be aborted. In one implementation, this is the most recent request that the data controller has received. A request could be aborted, for example, if a parity error occurs during the request phase and an error is signaled during the error phase. The data controller removes the request from the request queue and the data path clears any actions taken in furtherance of the previously issued request.

Clear: Indicates to the bus interface of the data path to clear a previously issued request from the bus interface. In one implementation, a read request could be placed on the bus by a bus master which is not going to receive data (e.g., the request could be given a retry response, a deferred response, or a hard fail response). If the SYSDEN# signal has already been asserted to the data path, then the data path is waiting to receive DRDY#. However, the data is not going to be coming for this transaction. The clear command indicates to the data path to clear any actions taken in furtherance of the request, even though the SYSDEN# signal has already been received.

Implicit Write Back: Indicates to the bus interface of the data path to take implicit write back data off the bus. The data controller provides byte enable information to indicate to the data path which bytes of data being received are valid or invalid. The data controller also provides a buffer number identifying a buffer corresponding to the outbound data queue which the data path should put the data into and the length of the implicit write back transaction. Upon receiving the write command, the data path sets up the appropriate internal data paths to place data into the buffer indicated by the data controller. The command also indicates to the data path that data from the memory subsystem will be imminently available to be merged with the implicit write back data.

The system commands shown above in Table IV are either one-cycle, two-cycle, or three-cycle commands. In one embodiment, the read and write commands are both two-cycle commands. The encoding for the two-cycle system commands according to one embodiment of the present invention is shown below in Table V. The CMD[x] signals shown in Table V represent the three-bit command code shown above in Table IV (e.g., a read or a write). The BUF[x] signals are a two-bit indicator of the buffer which data path 128 should use for the data being transferred. In one implementation of the present invention, data path 128 knows whether an inbound or outbound data buffer is being referenced based on the CMD[x] signals. For example, a buffer number with a read command references an inbound buffer, and a buffer number with a write command references an outbound buffer. The LEN[x] signals indicate the length of the data transfer.

TABLE V

| SYSCMD# Bit | First Cycle | Second Cycle |
| --- | --- | --- |
| 4 | CMD[2] | '0' |
| 3 | CMD[1] | '0' |
| 2 | CMD[0] | '1' if Configuration Address Write, '0' otherwise |
| 1 | BUF[1] | LEN[1] |
| 0 | BUF[0] | LEN[0] |

In one embodiment, data path 128 includes four data buffers corresponding to outbound data queue 450 and four data buffers corresponding to inbound data queue 460. The nature of the command (e.g., a read or a write), identifies which set of four buffers to use for the data, and the BUF[x] signals indicate which one of the four buffers within the set should be used.

The LEN[1:0] signals provide a two-bit encoding of the length of the transfer. In one implementation of the present invention, the encoding is as follows: "00" indicates a length of zero cycles, "01" indicates a length of one data cycle, "10" indicates a length of two data cycles, and "11" indicates a length of four data cycles. Each of these data cycles refers to a single processor bus clock cycle. Thus, for example, a length of two cycles in a system with a processor bus having a 64-bit data bus refers to a 128-bit data transfer.

It is to be appreciated that additional data buffers or longer lengths can be supported by the present invention by changing the above encoding or adding additional bits.

The implicit write back command shown in Table IV is a three-cycle command. Table VI shows the system command encoding for three-cycle commands according to one embodiment of the present invention. The CMD[x], BUF[x], and LEN[x] signals are the same as for the two-cycle commands discussed above. The BE[x] signals are the byte enable signals used by the implicit write back command. The byte enable signals indicate to the data path which of the first eight bytes of data it is about to receive are valid and which are invalid in order for the data path to perform the proper merging.

TABLE VI

| SYSCMD# Bit | First Cycle | Second Cycle | Third Cycle |
| --- | --- | --- | --- |
| 4 | CMD[2] | BE[7] | BE[4] |
| 3 | CMD[1] | BE[6] | BE[3] |
| 2 | CMD[0] | BE[5] | BE[2] |
| 1 | BUF[1] | LEN[1] | BE[1] |
| 0 | BUF[0] | LEN[0] | BE[0] |

Table VII shows the length encoding for three-cycle system commands according to one embodiment of the present invention.

TABLE VII

| LEN[1:0] | Length (Cycles) |
| --- | --- |
| 00 | 0 |
| 01 | 1 |
| 10 | 2 |
| 11 | 4 |

In one embodiment of the present invention, memory commands are transferred from DC 127 to DP 128 using the MEMCMD#[7:0] signals. In one implementation, the information encoded in the MEMCMD#[7:0] signals is as follows: MEMCMD#[7:4] encodes the memory side command; MEMCMD#[3:2] encodes the length of the data transfer; and MEMCMD#[1:0] encodes the buffer number in DP 128 to use for the transfer.

Table VII shows the command encoding for memory commands according to one embodiment of the present invention.

TABLE VIII

| MEMCMD#[7:4] | Description |
| --- | --- |
| 0000 | No command |
| 0001 | Read Memory |
| 0010 | Write Memory |
| 0011 | Scrub Memory |
| 0100 | Read Configuration |
| 0101 | Write Configuration Address Register |
| 0110 | Write Configuration Data Register |
| 0111 | Set Read Burst Delay |
| 1000 | Set ECC |
| 1001 | Read Modify Write |
| 1010 | Abort |
| 1011–1111 | Reserved |

Table IX shows the length encoding for memory commands according to one embodiment of the present invention. In one embodiment of the present invention, the length of the data transfer is provided in the same clock cycle as the buffer number.

TABLE IX

| LEN[1:0] | Length (Cycles) |
| --- | --- |
| 00 | 1 |
| 01 | 2 |
| 10 | 4 |
| 11 | Reserved |

In one embodiment of the present invention, a set of commands is issued over the MEMCMD#[7:4] lines as indicated above in Table VIII. These commands are used by data path 128 to set up and perform the necessary data transfers between data path 128 and memory subsystem 121. A summary of these commands follows.

Read Memory: The read memory command indicates to the data path that the data controller has started a memory read access and that data will be immanently available on the memory data pins. The length field of the command specifies the total number of data words and the buffer number indicates the destination in the inbound data buffer.

The length field can specify a special case where a write partial is pending and a read must be performed to get the invalid write bytes to merge with the valid bytes in the outbound data buffer. In this case the buffer number is not used and instead a merge register is used to hold the data until the subsequent write partial is commanded.

Write Memory: The write memory command indicates to the data path that the data controller has started a memory write access and data is immanently required on the memory data pins. The length field of the command specifies the total number of data words and the buffer number indicates the source of the data from the outbound data buffer. Byte enables are required for write partials to allow the merge of read data for the invalid bytes and these will follow in the next cycle.

Scrub Memory: After a correctable error is reported the correct data that now resides in the inbound data buffer is written back to memory. The scrub command is used to initiate this operation and writes the data in the indicated buffer number to memory. Once the command is sent a write operation will commence with the data source being the inbound data buffer.

Read Configuration: The read configuration command indicates that a configuration read request has occurred on the bus and that data is to be transferred from the configuration register space in the data controller to the inbound data buffer for eventual transfer to the processor bus. In one implementation the length of the configuration data is eight bytes. The buffer number in the command word specifies the destination location. In one implementation, the configuration data is transferred to the data path via the MEMCMD#[7:0] signal lines.

Write Configuration Address Register: Indicates that a write to the configuration address register has occurred on the bus and that data is to be transferred from the configuration data staging register in the data path 128 to the configuration registers in the data controller 127. In one implementation the length of the configuration address is four bytes. In one implementation, the configuration address is transferred to the data controller via the MEMCMD#[7:0] signal lines.

Write Configuration Data Register: Indicates that a write to a configuration data register has occurred on the bus and that data is to be transferred from the outbound data buffer to the configuration registers in the data controller 127. In one implementation the length of the configuration data is four bytes. The length provided for this command specifies whether the source is the upper or lower 32 bits of the 64 bits from the outbound data buffer. In one implementation, the configuration data is transferred to the data controller via the MEMCMD#[7:0] signal lines.

Set Read Burst Delay: Used to configure the data path for operation under a number of system configurations. This command sets the number of clocks between subsequent data words which the data path must wait before data is valid. "0" means no additional clocks, equivalent to a 1,1,1,1 burst rate. In one implementation, the read burst delay data is transferred to the data path via the MEMCMD#[7:0] signal lines.

Set ECC: Used to configure the data path for single bit and multiple bit checking and single bit correcting on both the system and memory side. The generation of code words (check bits) can also be enabled or disabled on the memory and system side. The command is immediately followed by the values to place in the register. In one implementation, the configuration data is transferred to the data path via the MEMCMD#[7:0] signal lines.

Read Modify Write: Used when a write request of fewer bits than the data bus width occurs (e.g., a write of fewer than eight bytes in the embodiment shown in FIG. 4). The eight-byte data element referenced by the write request is read from memory subsystem 121 and merged with the write data. The byte enable signals indicate which bytes of the write data should replace the data read from memory subsystem 121. ECC is then re-computed over the new (merged) data element and the data element and ECC are written to memory subsystem 121.

Abort: Indicates to the data path that a previously issued request from the data controller is to be aborted. In one implementation, this is the most recent request that the data controller has received. In response, the data path clears any actions taken in furtherance of the previously issued request.

Table X shows the signals used to transfer data between the memory subsystem 121 and the data path 128. It is to be appreciated that additional or different control signals can also be used to transfer data between the memory subsystem 121 and DP 128, depending on the type of memory chips used in memory subsystem 121.

TABLE X

| Signal | Description |
|---|---|
| MDE#[71:0] | Memory data and ECC. In one implementation, ECC is computed over 64-bit data words and parity is computed as byte-parity over a 64-bit word. |
| MA[11:0] | Memory address. Multiplexed row and column memory address asserted by the DC. |
| RAS# | Row address strobe. Asserted by the DC to indicate that the address on MA[11:0] is the row address. |
| CAS# | Column address strobe. Asserted by the DC to indicate that the address on MA[11:0] is the column address. |
| MDRDY# | Memory data ready. Asserted by the DP when write data on the memory bus is valid. |

Figure 5:
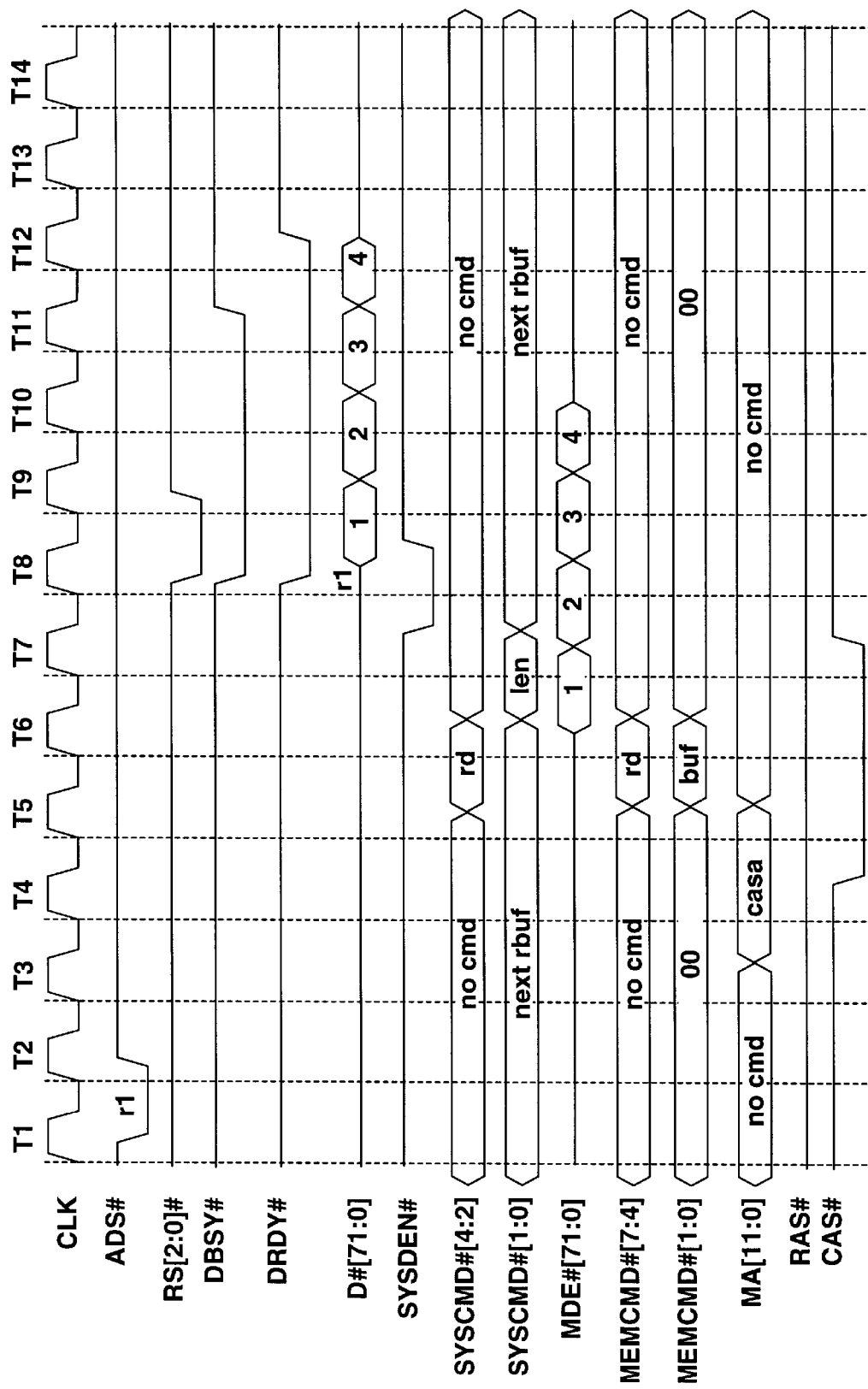
FIG. 5 is a timing diagram showing the timing of interchip signals for a memory read transaction according to one embodiment of the present invention.

FIG. 5 is a timing diagram showing the timing of the interchip signals for a memory read transaction according to one embodiment of the present invention. The timing diagram of FIG. 5 presumes an empty inbound buffer is available for the data to be read into and a page hit in the memory (that is, the requested data is available in memory and does not need to be swapped in from another storage device). The memory read request is placed on the bus by an agent in T1, and is clocked into DC 127 in T2. DC 127 decodes the request and transfers the request into its request queue. Assuming the request is not delayed in the request queue of DC 127 (e.g., due to additional previously issued requests), the request is immediately transferred to the memory controller of DC 127 which asserts the column memory address on MA[11:0] for the read request in T3. DC 127 then asserts the CAS# signal in T4, indicating that the address on MA[11:0] is the column address. It should be noted that the timing diagram of FIG. 5 assumes the row address corresponding to the read is already accessed by the memory subsystem, thereby removing the need to assert the RAS# signal.

DC 127 then asserts a read command to DP 128 on SYSCMD#[4:2] in T5. DC 127 also asserts the buffer number on SYSCMD#[1:0] in T3 through T6. In T6, DC 127 asserts the length of the read request on SYSCMD#[1:0] in T6, which is clocked into DP 128 in T7. In the example shown in FIG. 5, the length of the read is four clock cycles.

DC 127 then asserts a read command on MEMCMD# [7:4] in T5, which is clocked into DP 128 in T6. Also in T5, DC 127 indicates the inbound buffer number which DP 128 should transfer the data into. The buffer number is clocked into DP 128 in T6.

Data and ECC information are placed on MDE#[71:0] by the memory subsystem starting in T6 and are clocked into DP 128 starting in T7. In the example of FIG. 5, the memory read is a four clock cycle read, with 64 bits of data being transferred to DP 128 in each clock cycle. When data is received by DP 128 from the memory subsystem, the memory controller of DP 128 places the bit into the appropriate inbound data buffer, as previously identified.

DC 127 asserts SYSDEN# in T7, indicating that the data transfer is to occur and has not been aborted. In T8, DC 127 asserts RS[2:0]# to indicate the type of response and asserts DBSY#. Also in T8, DP 128 asserts DRDY# and also starts placing data and error information on the bus on D#[71:0]. In the example shown, D#[71:0] includes 64 data bits and 8 ECC bits. In T11, as the last chunk of data is placed on the bus, DBSY# is deasserted by DC 127. In T12, after the last chunk of data has been placed on the bus and an opportunity has been given for the requesting agent to clock in the data, DRDY# is deasserted by DP 128. The memory controller is then ready to respond to another request.

In the example shown in FIG. 5, SYSCMD#[1:0] continuously indicates the next inbound buffer to be used, except for T6 and T7, where it indicates the length of the read. It is to be appreciated that DC 127 need not continuously provide the next data buffer number. In the example shown, DP 128 continuously clocks in SYSCMD#[1:0], and in T6, once the read command is clocked in on SYSCMD# [4:2], DP 128 knows that it has also clocked in the read buffer number on SYSCMD#[1:0].

Figure 6:
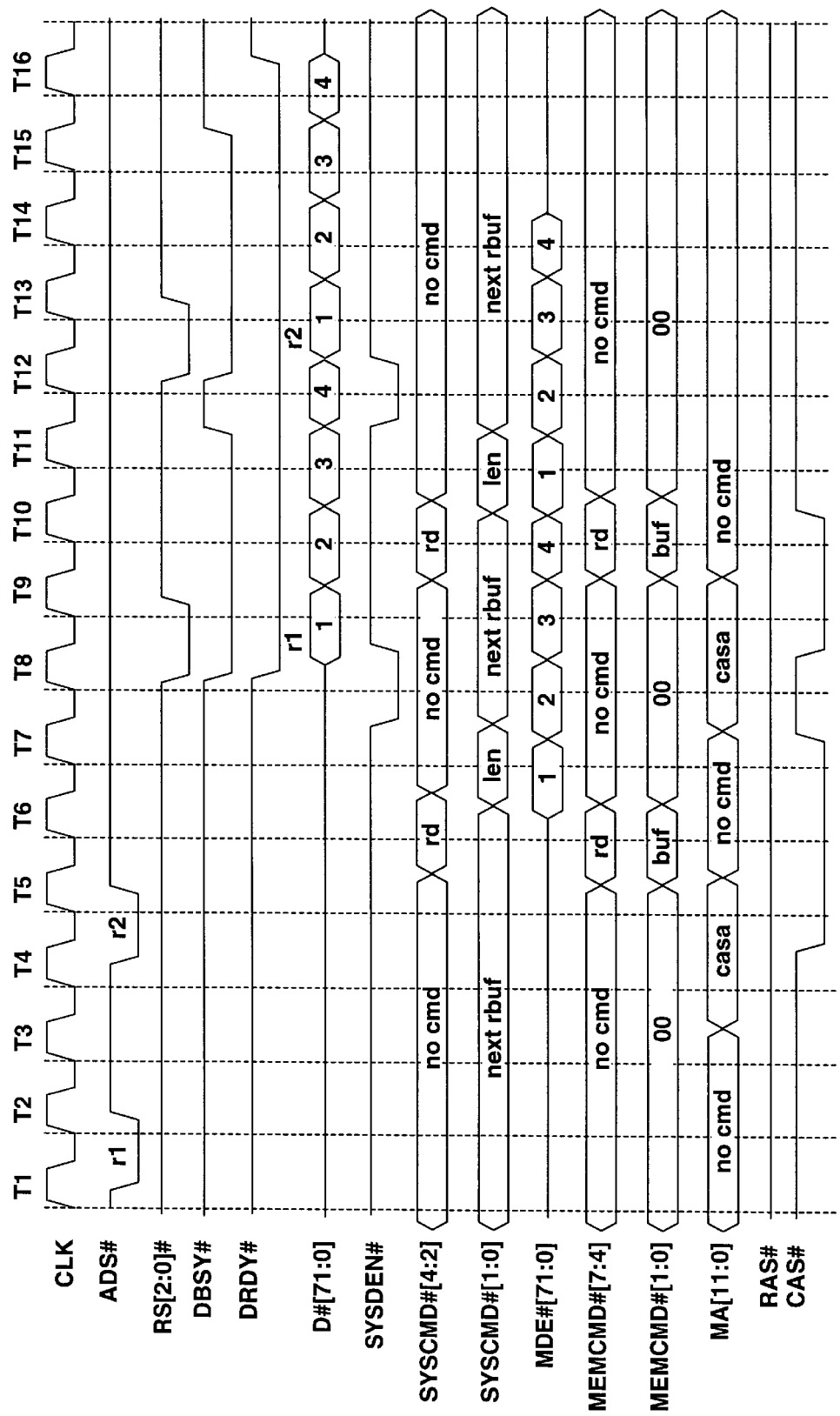
FIG. 6 is a timing diagram showing the timing of interchip signals for back-to-back memory read transactions according to one embodiment of the present invention.

FIG. 6 is a timing diagram showing the timing of the interchip signals for back-to-back memory read transactions according to one embodiment of the present invention. The timing diagram of FIG. 6 is similar to the timing diagram of FIG. 5, except that two back-to-back memory read transactions are shown. It should be noted that the buffer numbers for the two reads are different.

As shown in FIG. 6, a first read request r1 is placed on the bus in T1 and is clocked in by DC 127 in T2. DC 127 transfers the request to its request queue and notifies DP 128 of the read request via SYSCMD#[4:0]. In T4, a second read request r2 is placed on the bus, and is clocked in by DC 127 in T5. DC 127 also places the request into the request queue and notifies DP 128 of the read request via SYSCMD#[4:0] after SYSDEN# has been asserted for the first read request r1. As shown in FIG. 6, DC 127 notifies DP 128 of the second read request via SYSCMD#[4:0] four clocks after it notifies DP 128 of the first read request, even though the second read request is clocked in from the bus three clock cycles after the first request. This four-clock delay is due to the length of the read request being four clock cycles. As shown in FIG. 6, the acutal data transfers on MDE#[71:0] and D#[71:0] are back to back. Therefore, if the first read request were only one or two clocks in length, then the second read request could begin three clock cycles after the first request, rather than four cycles.

It should be noted that SYSCMD#[1:0] shown in FIG. 6 provides three different values, indicating three different read buffers. The first value is provided in T1 through T6, which identifies the read buffer used for the first read request. The second value is provided in T8 through T10, which identifies the read buffer used for the second read request. The third value is provided in T12 through T16, which identifies the next read buffer to be used for the next read request (not shown).

Figure 7:
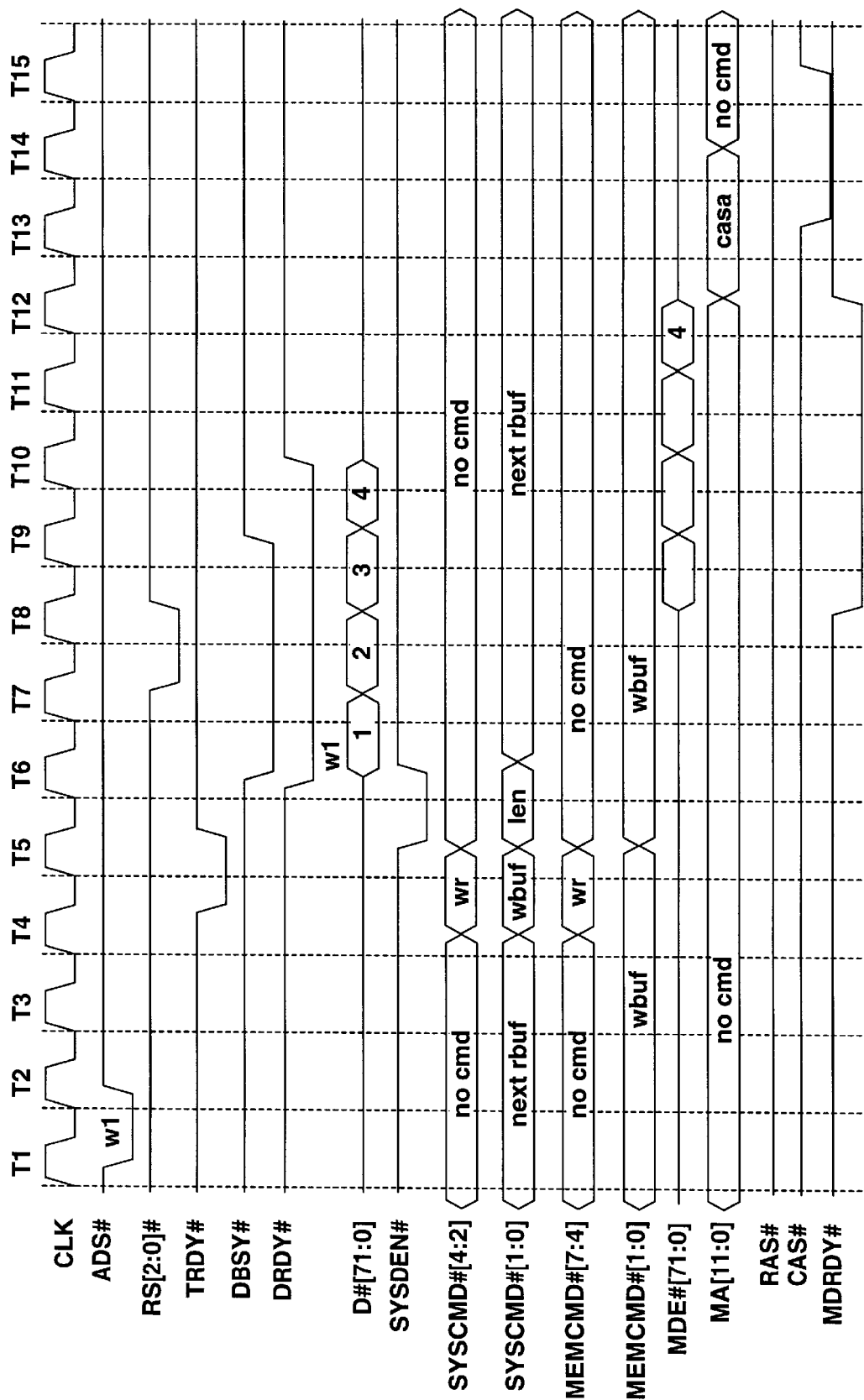
FIG. 7 is a timing diagram showing the timing of interchip signals for a write transaction according to one embodiment of the present invention.

FIG. 7 is a timing diagram showing the timing of the interchip signals for a write transaction according to one embodiment of the present invention. A write request is placed on the bus in T1 by an agent coupled to the bus. The request is clocked in by DC 127 in T2, which decodes the request and places the request into the request queue of DC 127. In T4, DC 127 asserts the TRDY# signal on the bus, thereby indicating to the agent which placed the request on the bus that the target device (the memory controller in this example) is ready to receive the write data. Also in T4, the system side command indicating a write is asserted on SYSCMD#[4:2] and the buffer number for the write data is asserted on SYSCMD#[1:0]. Both the write command and buffer number are clocked into DP 128 in T5. Additionally, the memory side command indicating a write is also asserted on MEMCMD#[7:4] in T4. In T5, the length of the write command is asserted on SYSCMD#[1:0] and is clocked into DP 128 in T6. Also in T5, the write buffer number is updated on MEMCMD#[1:0] to indicate the next write buffer for DP 128 to use.

In T5, the agent which placed the request on the bus receives the TRDY# signal. In response, the agent asserts the DBSY# and DRDY# signals in T6, along with the first chunk of data on D#[71:0]. The write data is received on D#[71:0] by DP 128 over four clocks. The agent then deasserts DBSY# in T9 and deasserts DRDY# in T10. In T7, DC 127 asserts a response to the agent on RS#[2:0], indicating that the write request has been completed (from the bus perspective).

In T8, DP 128 asserts the first chunk of the write data on MDE#[71:0] and asserts MDRDY# to indicate that the data on the memory data bus (that is, MDE#[71:0]) is valid. The write data is transferred over MDE# by DP 128 over four clocks. DP 128 then deasserts the MDRDY# signal in T12. Also in T12, DC 127 asserts the column memory address on MA[11:0] for two clocks. DC 127 then asserts the CAS# signal in T13, indicating that the address on MA[11:0] is the column address.

It should be noted that in the example shown in FIG. 7, SYSCMD#[1:0] is shown at particular times (e.g., T1 through T3 and T7 through T21) as providing the number of the next read buffer. In one embodiment of the present invention, DC 127 provides as a default value the number of the next read buffer to use on SYSCMD#[1:0]; a different value is only provided when necessary (e.g., a length value or write buffer number).

Figure 8:
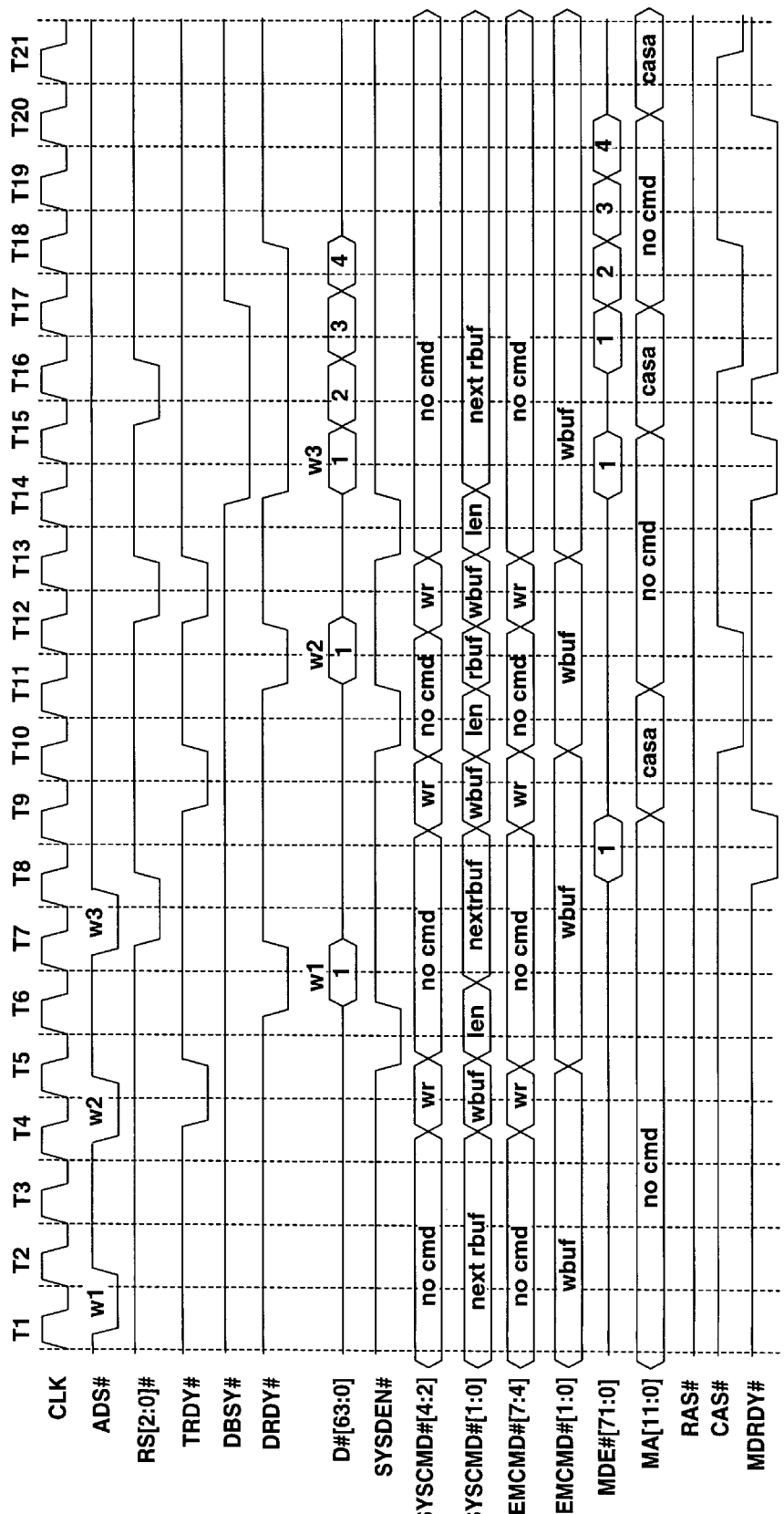
FIG. 8 is a timing diagram showing the timing of interchip signals for back-to-back write transactions according to one embodiment of the present invention.

FIG. 8 is a timing diagram showing the timing of the interchip signals for back-to-back write transactions according to one embodiment of the present invention. In the example shown, each of the first two write transactions has a length of one clock cycle (referred to as a partial write), and the third write transaction has a length of four cycles. The write transactions are performed analogous to the discussion above regarding FIG. 7. The DBSY# and DRDY# signals are asserted at the times shown by the agent(s) placing the corresponding request on the bus. It is to be appreciated that the write transactions could originate with the same agent on the bus, or alternatively, originate with different agents on the bus.

It should also be noted that the write buffer numbers provided on SYSCMD#[1:0] are different for each write transaction shown in FIG. 8.

FIGS. 5–8 are timing diagrams showing the interchip signals between a data controller chip and a data path chip for various transactions which can occur on the bus. It is to be appreciated that these timing diagrams are only examples of signal timing according to one embodiment of the present invention. A wide variety of changes to the timings shown in FIGS. 5–8 can be made within the spirit and scope of the present invention.

In one embodiment of the present invention, data controller chip 127 and data path chip 128 are connected to bus 101 in a conventional manner using multiple pins. Alternatively, chips 127 and 128 may be coupled to bus 101 in any of a wide variety of other conventional manners.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

Thus, a method and apparatus for controlling data transfers between a bus and a memory device using a multi-chip memory controller has been described.

What is claimed is:

1. A memory controller for use in a computer system having a bus comprising:

a data controller unit;
   a data path unit, wherein the data controller unit and the data path unit are two physically separate chips, and wherein the data controller unit and the data path unit both conform to a one physical load per logical load constraint;
   an interface coupled to the data controller unit and the data path unit to transfer control information between the data controller unit and the data path unit; and
   wherein the data controller unit provides control information to the data path unit in response to requests received from the bus which enable the data path unit to transfer data to and from the bus.

2. The memory controller of claim 1, wherein the data controller unit comprises:

a request queue;
   a bus interface coupled to the request queue, wherein the bus interface receives control signals from the bus; and
   a memory subsystem controller coupled to the request queue which provides memory access signals to a memory subsystem in accordance with requests in the request queue.

3. The memory controller of claim 1, wherein the data path unit comprises:

an inbound data queue;
   an outbound data queue;
   a bus interface coupled to the inbound data queue and the outbound data queue, wherein the bus interface receives data from and transfers data to the bus; and
   a memory subsystem controller coupled to the inbound data queue and the outbound data queue, wherein the memory subsystem controller receives data from and transfers data to a memory subsystem.

4. A method of controlling data transfers between a bus and a memory device using a memory controller, wherein the memory controller includes two separate chips, one chip being a data controller chip and a second chip being a data path chip, wherein the data controller chip and the data path chip together conform to a one physical load per logical load constraint, the method comprising the steps of:

receiving a request from the bus by the data controller chip;
   providing a signal based on the request from the data controller chip to the data path chip;
   the data controller chip providing a signal to the data path chip identifying a buffer element of the data path chip to receive data; and
   transferring the data to the buffer element.

5. The method of claim 4, further comprising the step of placing the request in a queue of the data controller chip.

6. The method of claim 4, further comprising the steps of:

generating a plurality of signals based on the request, wherein the plurality of signals identify a location to be accessed in the memory device; and
   transferring the plurality of signals to the memory device.

7. The method of claim 6, wherein the plurality of signals includes a row address strobe and a column address strobe.

8. The method of claim 4, wherein the data path chip receives the data from the memory device.

9. The method of claim 4, further comprising the step of transferring the data to the bus.

10. A computer system comprising:

a bus;
   a memory subsystem;
   a data controller coupled to the bus and the memory subsystem;
   a data path coupled to the bus and the memory subsystem, wherein the data controller and the data path are separate Application Specific Integrated Circuits (ASICs) coupled to the bus which together conform to a one physical load per logical load constraint; and
   wherein the data controller provides a signal to the data path indicating a command received from the bus, and wherein the data controller also provides a plurality of signals to the memory subsystem identifying data corresponding to the command.

11. The computer system of claim 10, wherein the memory subsystem transfers the data to the data path responsive to the plurality of signals.

12. An apparatus for controlling data transfers between a bus and a memory device comprising:

a data controller;
   a data path, wherein the data controller and the data path are embodied in two separate Application Specific Integrated Circuits (ASICs) coupled to the bus which together conform to a one physical load per logical load constraint;
   means for receiving a request from the bus by the data controller;
   means for providing a signal based on the request from the data controller to the data path;
   means for the data controller providing a signal to the data path identifying a buffer element of the data path to receive data; and
   means for transferring the data to the buffer element.

13. The apparatus of claim 12, further comprising:

means for generating a plurality of signals based on the request, wherein the plurality of signals identify a location to be accessed in the memory device; and
   means for transferring the plurality of signals to the memory device.

14. The apparatus of claim 12, further comprising means for transferring the data from the memory device to the buffer element of the data path.

* * * * *